(12) United States Patent
Rozen et al.

(10) Patent No.: US 8,112,645 B2
(45) Date of Patent: Feb. 7, 2012

(54) SYSTEM AND METHOD FOR POWER MANAGEMENT

(75) Inventors: Anton Rozen, Gedera (IL); Dan Kuzmin, Givat Shmuel (IL); Michael Priel, Hertzelia (IL)

(73) Assignee: Freescale Semiconductor, Inc., Austin, TX (US)

( * ) Notice: Subject to any disclaimer, the term of this patent is extended or adjusted under 35 U.S.C. 154(b) by 777 days.

(21) Appl. No.: 12/179,844

(22) Filed: Jul. 25, 2008

(65) Prior Publication Data

US 2010/0019837 A1 Jan. 28, 2010

(51) Int. Cl.
*G06F 1/00* (2006.01)
*G06F 1/26* (2006.01)
*G06F 1/32* (2006.01)

(52) U.S. Cl. ........................ 713/320; 713/300

(58) Field of Classification Search .................. 713/300, 713/320
See application file for complete search history.

(56) References Cited

U.S. PATENT DOCUMENTS

| | | | |
|---|---|---|---|
| 5,517,649 A * | 5/1996 | McLean | 713/323 |
| 5,682,273 A * | 10/1997 | Hetzler | 360/75 |
| 5,954,820 A * | 9/1999 | Hetzler | 713/323 |
| 6,931,555 B2 | 8/2005 | Osborn | |
| 7,032,119 B2 | 4/2006 | Fung | |
| 7,051,218 B1 | 5/2006 | Gulick et al. | |
| 7,263,625 B2 | 8/2007 | Katoh et al. | |
| 7,412,615 B2 * | 8/2008 | Yokota et al. | 713/323 |
| 2008/0189563 A1 * | 8/2008 | Itkin | 713/300 |

FOREIGN PATENT DOCUMENTS

| | | |
|---|---|---|
| JP | 2006309933 | 11/2006 |
| JP | 2004110203 | 3/2010 |

OTHER PUBLICATIONS

International Application No. PCT/US2009/041079 Search Report and Written Opinion dated Dec. 7, 2009.

* cited by examiner

*Primary Examiner* — Mark Connolly

(57) ABSTRACT

A system, that includes: a memory unit adapted to store state duration statistics indicative of possible low power state durations and probabilities associates with the possible state durations; and a power controller, adapted to: receive a request to cause a circuit to enter a next state, and assist in causing the circuit to enter the next state if during a delay period that follows a reception of the request the power controller does not receive a request to cause the circuit to exit the next state; wherein the delay period is determined in response to: (i) the next state duration statistics, (ii) power saving gained from entering the next state; and (iii) power penalty associated with entering the next state and exiting the next state.

21 Claims, 5 Drawing Sheets

SYSTEM AND METHOD FOR POWER MANAGEMENT

FIELD OF THE INVENTION

This disclosure relates generally to a system and method for power management.

BACKGROUND OF THE INVENTION

An integrated circuit is expected to provide a trade off between performance (throughput, speed) and power consumption.

Various power reductions techniques include differential voltage and frequency scaling (DVFS), and power gating. DFVS alters the voltage supply level and the frequency of clock signals that are provided to a circuit while power gating involves shutting down the entire circuit or selected portions of that circuit.

Changing the state of the circuit from one state to another is associated with various power penalties. Some penalties can be associated with charging and discharging one or more decoupling capacitors of the circuit.

SUMMARY OF THE PRESENT INVENTION

The present invention provides a method and a device as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings.

DETAILED DESCRIPTION OF THE DRAWINGS

Figure 1:
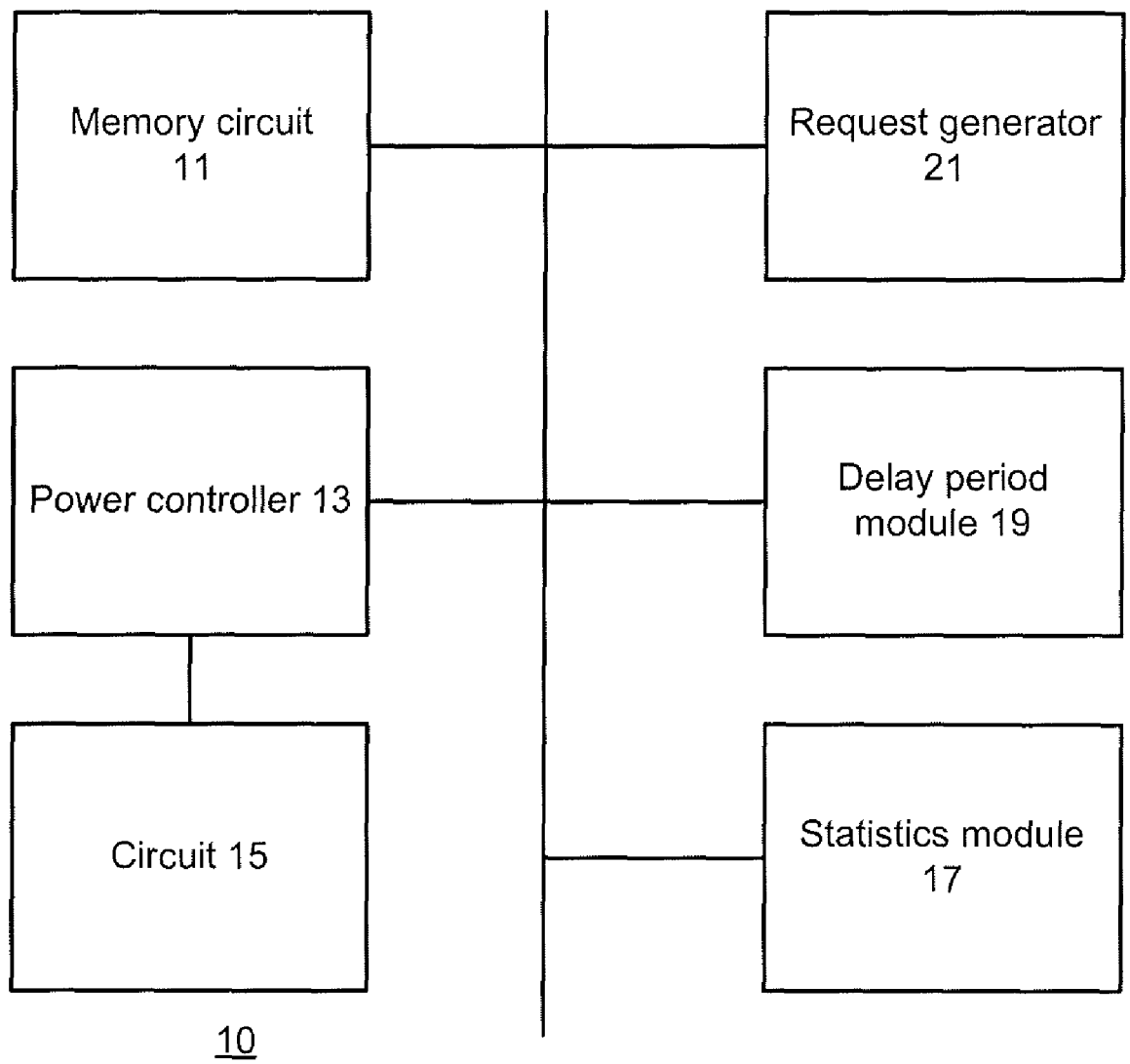
FIG. 1 schematically shows an example of an embodiment of a system.

In the following specification, the invention will be described with reference to specific examples of embodiments of the invention. It will, however, be evident that various modifications and changes may be made therein without departing from the broader spirit and scope of the invention as set forth in the appended claims.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

It has been shown that changing a state of a circuit from one state to the other can take into account state duration statistics that can provide an indication whether it is worth changing the state. These states differ from each other by the power consumption associated with them.

It has been shown that entering a circuit into a low power state is justified only if the an expected duration of the low power state justifies it.

A system is provided. It includes: (i) a memory unit adapted to store state duration statistics of at least one state; and (ii) a power controller, adapted to: (a) receive a request to cause a circuit to change its state from a current state to a next state; wherein the current state is associated with a different power consumption than the next state; and (b) assist in causing the circuit to enter the next state if during a next state delay period (that follows a reception of the request) the power controller does not receive a request to cause the circuit to exit the next state. The next state delay period is determined in response to: (a) state duration statistics of the next state; (b) power saving gained from entering the next state; and (c) power penalty associated with entering the next state and exiting the next state.

The system can include a statistics module that is adapted to calculate the next state duration statistics. It can apply one or more statistical or probabilistic methods for estimating the duration of the next state.

The system can include a delay period module that is adapted to determine the next state delay period.

The delay period module is adapted to determine the next state delay period by: (a) integrating the probabilities associated with the possible next state durations to provide a first integral; (b) multiplying each point in the integral by a power saving gained from entering the next state to provide a second integral; (c) finding a crossing point of the second integral and a line that represents the power penalty associated with entering the next state; and (d) determining the next state delay period in response to the crossing point.

The power controller can assist in causing the circuit to exit the next state in response to the next state duration statistics.

The next state can be a low power state (such as but not limited to an idle state) or an intermediate power state. For simplicity of explanation, FIG. 1, FIG. 2, FIG. 3, and FIG. 4 as well as their description assume that the next state is a low power state.

Referring to the example of FIG. 1, system 10 includes memory circuit 11, power controller 13, circuit 15, statistics module 17, delay period module 19 and request generator 21.

Power controller 13, memory circuit 11, statistics module 17, delay period module 19 and request generator 21 are connected to each other. Power controller 13 is connected to circuit 15.

Each of the mentioned above units (except circuit 15) can include hardware and additionally or alternatively software elements. Circuit 15 includes at least one hardware element. Circuit 15 can operate at different modes that can differ from each other by their associated power consumption levels. Circuit 15 can be a controller, a core, a general purpose processor, a digital signal processor, a system on chip, and the like. Circuit 15 can be included in the same integrated circuit as other components such as power controller 13, memory circuit 11, statistics module 17, delay period module 19 and request generator 21, but this is not necessarily so.

Power controller 13 can assist in causing circuit 15 to enter a certain power state by altering the supply voltage provided to circuit 15, by altering the frequency of clock signals provided to circuit 15, by shutting down circuit 15 or portions thereof or by merely controlling such acts. Power controller 13 can include a clock source, a voltage supply source but can be also just connected to such units.

Memory unit 11 is adapted to store low power state duration statistics indicative of possible low power state durations and probabilities associated with the possible low power state durations.

Power controller 13 is adapted to: (i) receive, from request generator 21, a request to cause circuit 15 to enter a low power state, and (ii) assist in causing circuit 15 to enter the low power state if during a delay period that follows a reception of the request power controller 13 does not receive a request to cause the circuit to exit the low power state. If during the delay period a request to exit the low power mode is received then power controller 13 does not cause circuit 15 to enter the low power state.

The delay period can be received by system 10, updated by system 10 or determined by system 10 or a combination thereof.

The delay period is determined in response to: (i) low power state duration statistics; (ii) power saving gained from entering the low power state; and (iii) power penalty associated with entering the low power state and exiting the low power state.

Figure 2:
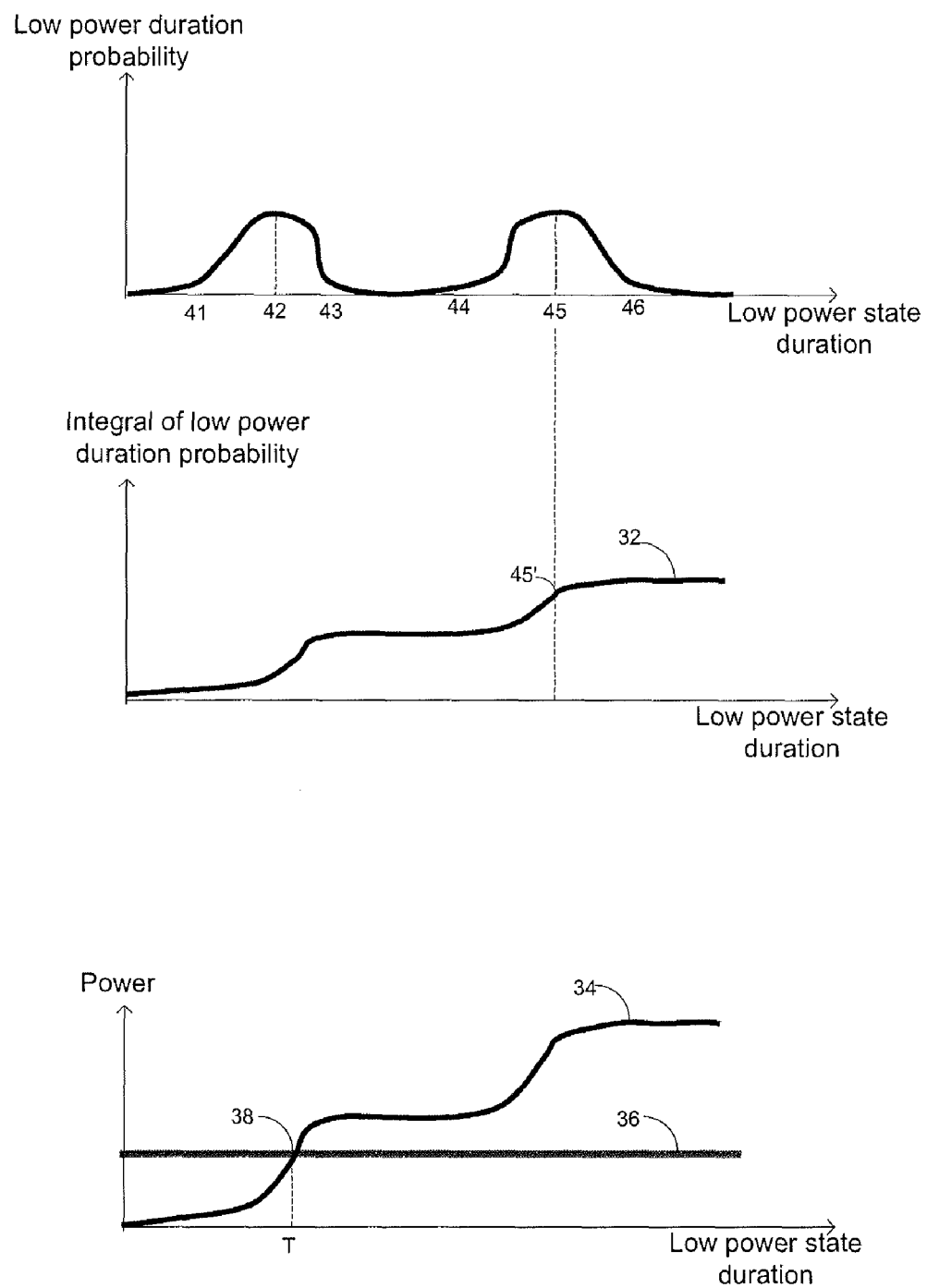
FIG. 2 schematically shows an example of low power state duration statistics, a first integral and a second integral.

Statistics module 17 is adapted to calculate the low power state duration statistics. In the example of FIG. 2 curve 30 represents the low power state duration statistics. Two durations (42 and 45) are highly probable. Each of these high probability durations is included in a corresponding probable duration range—high probability duration 42 is included in a first duration range defined between durations 41 and 43, while the high probability duration 45 is included in a second duration range defined between durations 44 and 46.

It is noted that the low power state statistics can differ from one application to the other and from one circuit to the other. Statistics module 17 can receive selection information that will assist in selecting the most appropriate low power state duration statistics. The selection information can be provided by a processor or other unit of system 10 that is aware of the expected application that is going to be executed by circuit 15 or by another unit that can request circuit 15 to enter a low power state.

Referring back to the example of FIG. 1, statistics module 17 can update the statistics based upon actual durations of the low power states.

Delay period module 19 is adapted to determine the delay period.

It can determine the delay period by: (i) integrating the probabilities associated with the possible low power state durations to provide a first integral; (ii) multiplying each point in the integral by a power saving gained from entering the low power state to provide a second integral; (iii) finding a crossing point of the second integral and a line that represents the power penalty associated with entering the low power state; and determining the delay period in response to the crossing point.

The example of FIG. 2 illustrates: (i) curve 32 that represents a first integral that is an integral of curve 30, (ii) curve 34 that represents a multiplication of the first integral by the power saving, (iii) line 36 that represents the power penalty, and (iv) crossing point 38 between line 36 and curve 34.

The duration of delay period can equal the time value (T) of crossing point 38.

The low power state can be a sleep state and power controller 13 can assist in entering circuit 15 to a sleep mode while retaining state information of circuit 15.

The low power state statistics can be utilized for exiting the low power state. By estimating when the low power state ends circuit 15 can be powered up even before receiving a request to exit the low power state, thus saving time associated with such an exit. Referring to the example of FIG. 2, power controller 13 can determine to wake up circuit 15 after a duration that corresponds to duration 45 or 46 passes from the reception of the request to cause circuit 15 to enter a low power state.

Thus, power controller 13 can be adapted to assist in causing the circuit to exit the low power state in response to the low power state duration statistics.

Figure 3:
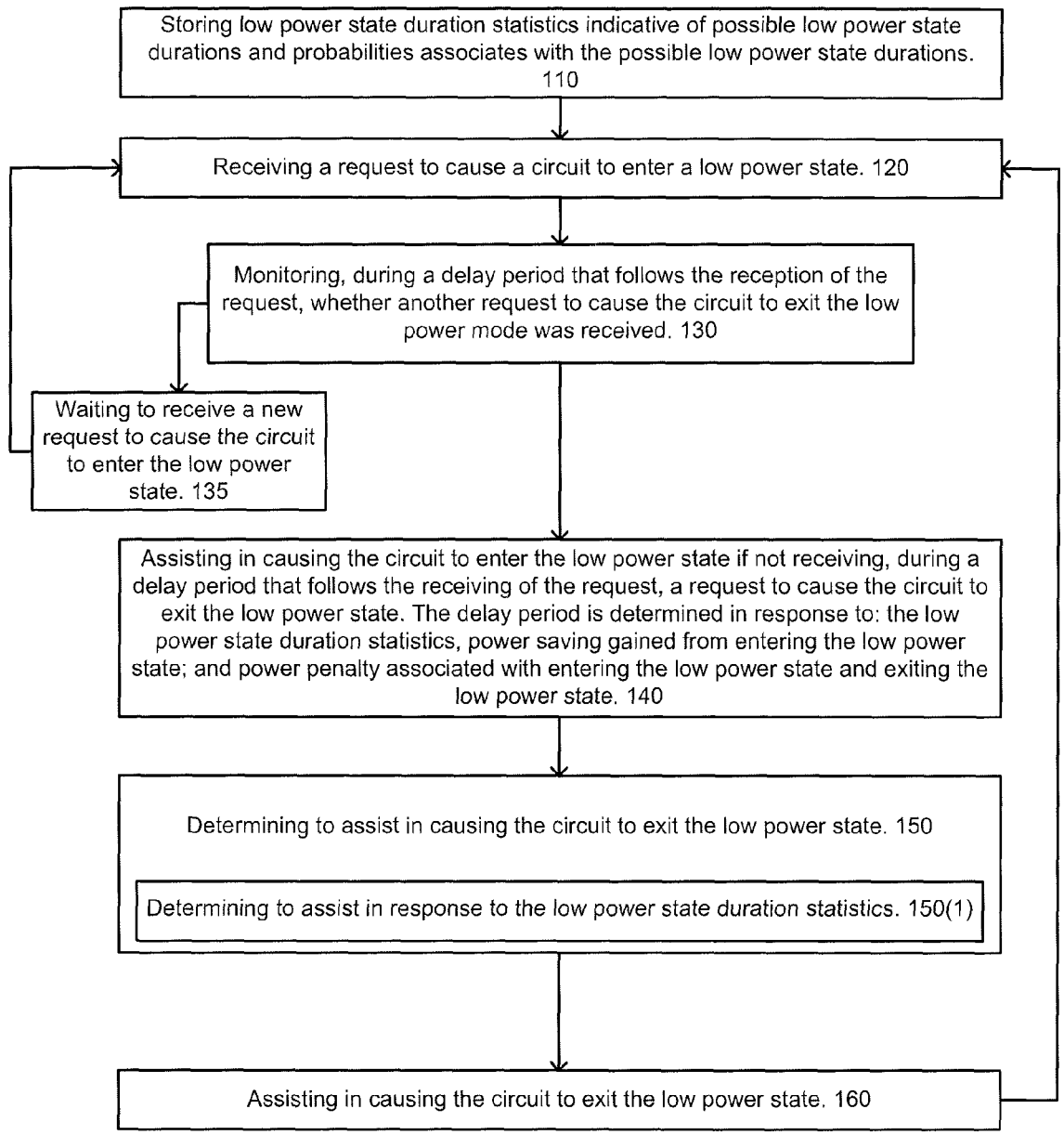
FIG. 3 schematically shows a flow chart of an example of an embodiment of a method.

FIG. 3 schematically shows a flow chart of an example of an embodiment of method 100.

Method 100 starts by stage 110 of storing low power state duration statistics indicative of possible low power state durations and probabilities associated with the possible low power state durations. Stage 110 can be followed by a reception of such information or by generating (or updating) such information.

Stage 110 is followed by stage 120 receiving a request to cause a circuit to enter a low power state.

Stage 120 is followed by stage 130 of monitoring, during a delay period that follows the reception of the request, whether another request to cause the circuit to exit the low power mode was received. If the answer if positive (such another request was received) then stage 130 is followed by stage 135 of waiting to receive a new request to cause the circuit to enter the low power state.

If the answer is negative (no such other request was received) then stage 130 is followed by stage 140 of assisting in causing the circuit to enter the low power state if not receiving, during a delay period that follows the receiving of the request, a request to cause the circuit to exit the low power state. The delay period is determined in response to: the low power state duration statistics, power saving gained from entering the low power state; and power penalty associated with entering the low power state and exiting the low power state.

Stage 140 can include assisting in entering the circuit to a sleep mode while retaining state information of the circuit.

Stage 140 is followed by stage 150 of determining to assist in causing the circuit to exit the low power state. Stage 150 can be triggered by receiving a request to cause the circuit to exit the low power state.

Stage 150 can include stage 150 (1) of determining to assist in response to the low power state duration statistics. Thus, stage 150(1) can include estimating, based upon the low power state duration statistics that the low power state is about to end and determine in assisting.

Stage 150 is followed by stage 160 of assisting in causing the circuit to exit the low power state. Stage 160 can be followed by stage 135.

Figure 4:
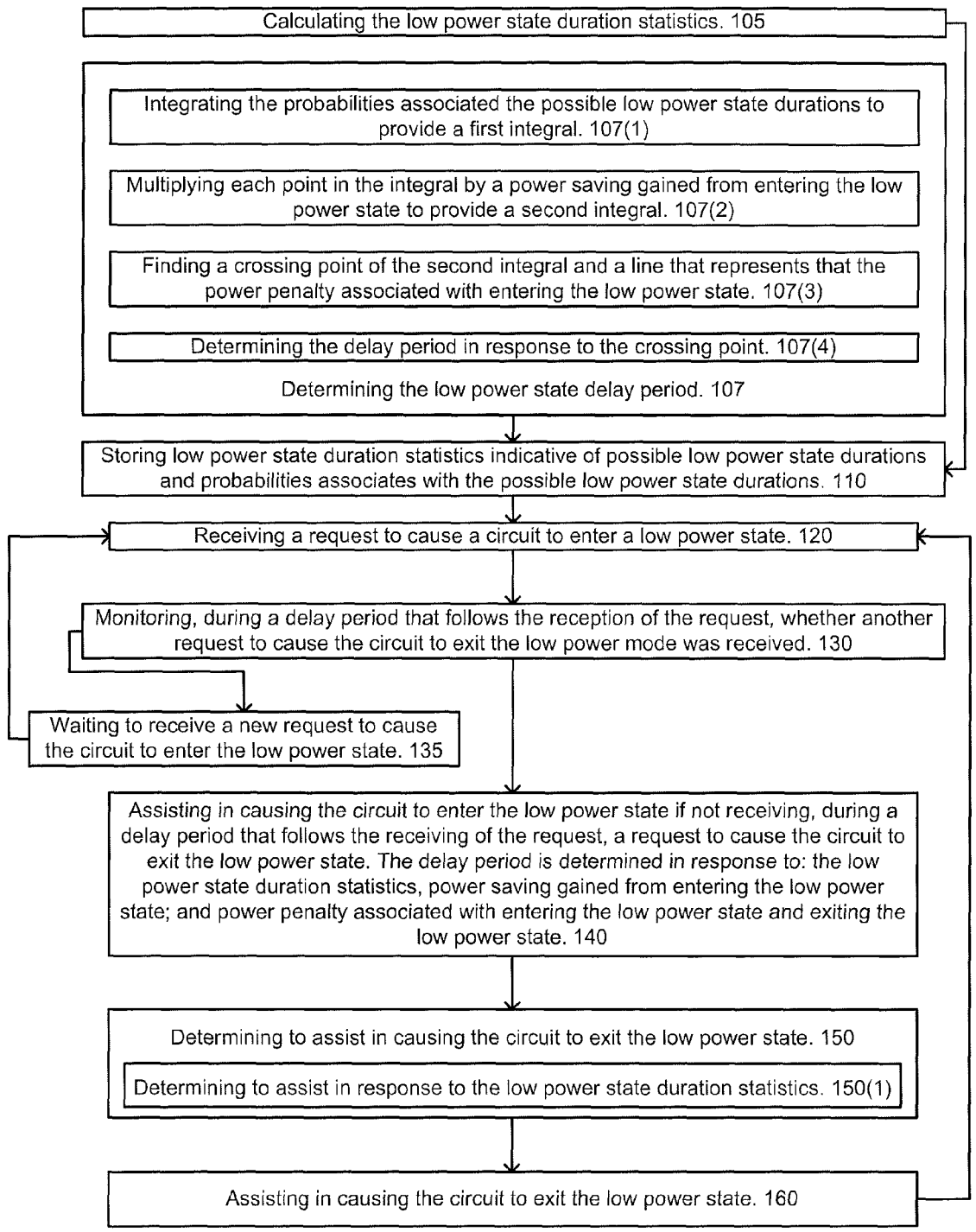
FIG. 4 schematically shows a flow chart of an example of an embodiment of a method.

FIG. 4 schematically shows a flow chart of an example of an embodiment of method 102.

Method 102 of FIG. 4 differs from method 100 of FIG. 3 by including stage 105 and 107.

Stage 105 includes calculating the low power state duration statistics.

Stage 107 includes determining the delay period.

Stage 107 can include the following stages: stage 107(1) of integrating the probabilities associated the possible low power state durations to provide a first integral; stage 107(2) of multiplying each point in the integral by a power saving gained from entering the low power state to provide a second integral; stage 107(3) of finding a crossing point of the second integral and a line that represents that the power penalty associated with entering the low power state; and stage 107(4) of determining the delay period in response to the crossing point.

The mentioned above description refers to a low power state. It is noted that the power consumption of system 10 can be reduced by placing circuit 15 into one or more intermediate power states. The power consumption associated with each of these intermediate power states is higher than the power consumption associated with the low power state but is lower than a power consumption of a maximal power state.

When such intermediate states exist, power controller 13 can determine whether to change the state of circuit 13 based upon intermediate state duration statistics, power saving gained from entering the intermediate power state; and power penalty associated with entering the intermediate power state and exiting the intermediate power state.

Statistics module 17 can calculate the intermediate state duration statistics and delay period module 19 can calculate a second delay period (or any other period associated with an intermediate power state).

In order to determine whether to change the state of circuit 13 from one state to an intermediate power, state controller 15 can perform the following: receive a request to cause a circuit to enter an intermediate level power state, and assist in causing the circuit to enter the intermediate power state if during a second delay period that follows a reception of the request the power controller does not receive a request to cause the circuit to exit the intermediate power state; wherein the second delay period is determined in response to: intermediate power state duration statistics, power saving gained from entering the intermediate power state; and power penalty associated with entering the intermediate power state and exiting the intermediate power state.

Figure 5:
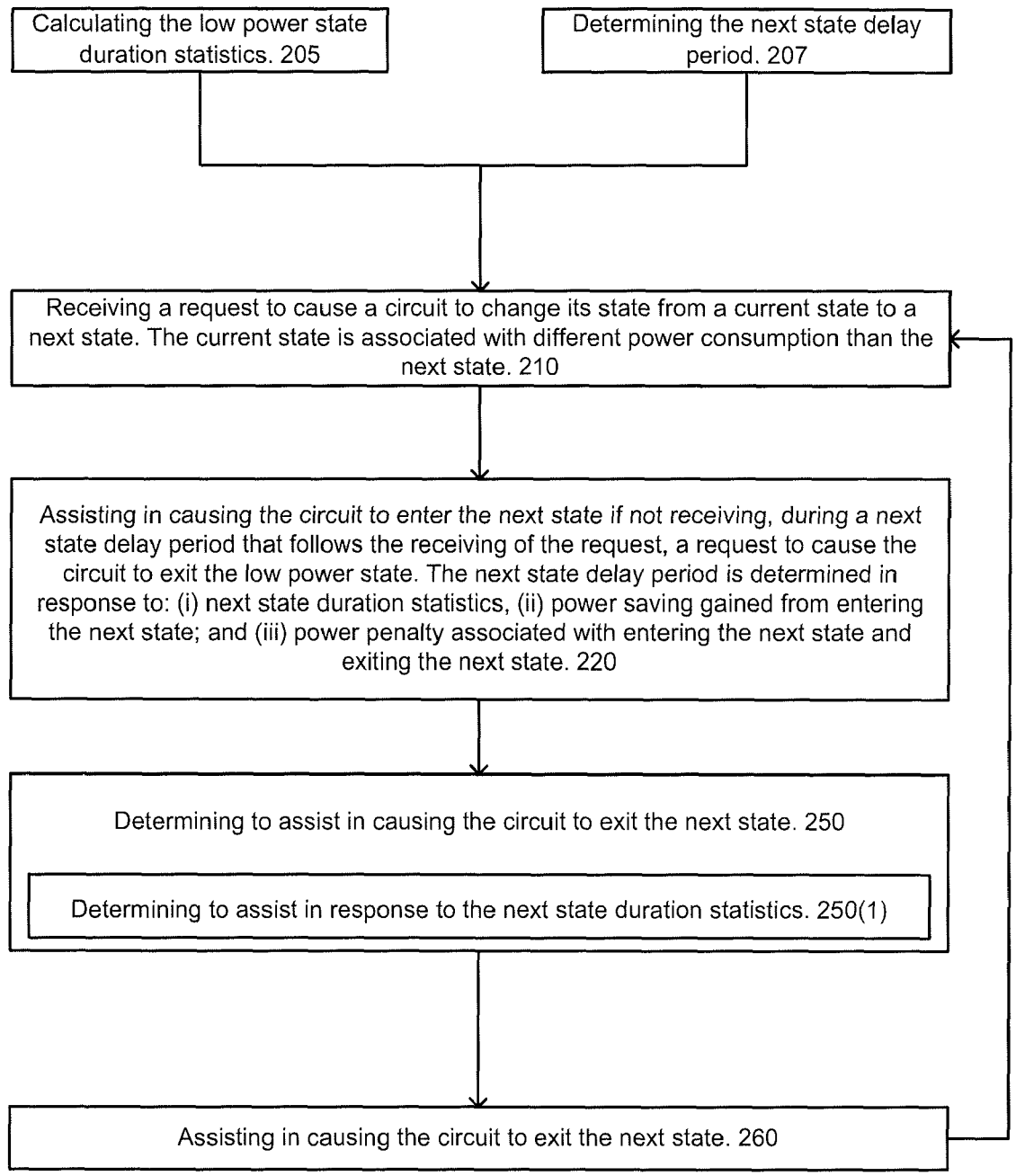
FIG. 5 schematically shows a flow chart of an example of an embodiment of a method.

FIG. 5 schematically shows a flow chart of an example of an embodiment of method 200.

Method 200 starts by stage 210 of receiving a request to cause a circuit to change its state from a current state to a next state. The current state is associated with different power consumption than the next state. The next state can be associated with lower power consumption than the next state. The next state can be a low power state or an intermediate power state.

Stage 210 is followed by stage 220 of assisting in causing the circuit to enter the next state if not receiving, during a next state delay period that follows the receiving of the request, a request to cause the circuit to exit the low power state. The next state delay period is determined in response to: (i) next state duration statistics, (ii) power saving gained from entering the next state; and (iii) power penalty associated with entering the next state and exiting the next state.

It is noted that each period can be associated with its own delay period. For example, a low power state will be entered only after a low power state delay period lapses.

One or more states can be associated with state duration statistics. For example, a low power state can be associated with low power state duration statistics and an intermediate power state can be associated with intermediate power state duration statistics. If the circuit is at a certain state and the method has to determine whether to change its state to a low power state then low power state duration statistics will be taken into account.

The example of FIG. 5 illustrates method 200 as including stage 205 and 207. These stages precede stage 210.

Stage 205 includes calculating the low power state duration statistics.

Stage 207 includes determining the next state delay period.

Stage 207 can include: integrating the probabilities associated the possible next state durations to provide a first integral; multiplying each point in the integral by a power saving gained from entering the next state to provide a second integral; finding a crossing point of the second integral and a line that represents that the power penalty associated with entering the next state; and determining the delay period in response to the crossing point.

Method 200 can also include stage 250 of determining to assist in causing the circuit to exit the low power state. Stage 250 can include receiving an indication that the circuit should change its state. Stage 250 can include stage 250(1) of determining to assist in response to the next state duration statistics.

Stage 250 can be followed by stage 260 assisting in causing the circuit to exit the low power state.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations, and alternatives are also possible. The specifications and drawings are, accordingly, to be regarded in an illustrative rather than in a restrictive sense.

The word 'comprising' does not exclude the presence of other elements or steps then those listed in a claim.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A system, comprising:
   a memory unit adapted to store state duration statistics of at least one state; and
   a power controller, adapted to:
      receive a request to cause a circuit to change its state from a current state to a next state; wherein the current state is associated with a different power consumption than the next state; and
      assist in causing the circuit to enter the next state if during a next state delay period that follows a reception of the request the power controller does not receive a request to cause the circuit to exit the next state;
      wherein the next state delay period is determined in response to:
         state duration statistics of the next state;
         power saving gained from entering the next state; and
         power penalty associated with entering the next state and exiting the next state.

2. The system according to claim 1 comprising a statistics module that is adapted to calculate the next state duration statistics.

3. The system according to claim 1 comprising a delay period module that is adapted to determine the next state delay period.

4. The system according to claim 3 wherein the delay period module is adapted to determine the next state delay period by:
   integrating the probabilities associated the possible next state durations to provide a first integral;
   multiplying each point in the integral by a power saving gained from entering the next state to provide a second integral;
   finding a crossing point of the second integral and a line that represents that the power penalty associated with entering the next state; and
   determining the next state delay period in response to the crossing point.

5. The system according to claim 1 wherein the power controller is adapted to assist in causing the circuit to exit the next state in response to the next state duration statistics.

6. The system according to claim 1 wherein the next state is a low power state.

7. The system according to claim 1 wherein the next state is an intermediate power state.

8. A method for power management, the method comprising:
   receiving a request to cause a circuit to change its state from a current state to a next state, wherein the current state is associated with a different power consumption than the next state; and
   assisting in causing the circuit to enter the next state if not receiving, during a next state delay period that follows the receiving of the request, a request to cause the circuit to exit the next state;
   wherein the next state delay period is determined in response to:
      next state duration statistics;
      power saving gained from entering the next state; and
      power penalty associated with entering the next state and exiting the next state.

9. The method according to claim 8 comprising calculating the next state duration statistics.

10. The method according to claim 8 comprising determining the delay period.

11. The method according to claim 8 comprising determining the delay period by:
    integrating the probabilities associated the possible next state durations to provide a first integral;
    multiplying each point in the integral by a power saving gained from entering the next state to provide a second integral;
    finding a crossing point of the second integral and a line that represents that the power penalty associated with entering the next state; and
    determining the delay period in response to the crossing point.

12. The method according to claim 8 comprising assisting in causing the circuit to exit the next state in response to the next state duration statistics.

13. The method according to claim 8 wherein the next state is a low power state.

14. The method according to claim 8 wherein the next state is an intermediate power state.

15. A computer program product that comprises a non-transitory computer program medium that stores instructions for:
    receiving a request to cause a circuit to enter a next state; and
    assisting in causing the circuit to enter the next state if not receiving, during a delay period that follows the receiving of the request, a request to cause the circuit to exit the next state;
    wherein the delay period is determined in response to:
       next state duration statistics;
       power saving gained from entering the next state; and
       power penalty associated with entering the next state and exiting the next state.

16. The computer program product according to claim 15 comprising instructions for calculating the next state duration statistics.

17. The computer program product according to claim 15 comprising instructions for determining the delay period.

18. The computer program product according to claim 17 comprising instructions for determining the delay period by:
    integrating the probabilities associated the possible next state durations to provide a first integral;
    multiplying each point in the integral by a power saving gained from entering the next state to provide a second integral;
    finding a crossing point of the second integral and a line that represents that the power penalty associated with entering the next state; and
    determining the delay period in response to the crossing point.

19. The method according to claim 15 comprising instructions for assisting in causing the circuit to exit the next state in response to the next state duration statistics.

20. The computer program product according to claim 15 wherein the next state is a low power state.

21. The computer program product according to claim 15 wherein the next state is an intermediate power state.

* * * * *